(12) United States Patent
Lee

(10) Patent No.: US 8,002,340 B2
(45) Date of Patent: Aug. 23, 2011

(54) JOINT STRUCTURE FOR FIXING BETWEEN SUNROOF AND HEADLINER

(75) Inventor: Jae Yong Lee, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/619,340

(22) Filed: Nov. 16, 2009

(65) Prior Publication Data

US 2011/0025102 A1  Feb. 3, 2011

(30) Foreign Application Priority Data

Jul. 30, 2009  (KR) .................. 10-2009-0069999

(51) Int. Cl.
*B60R 13/02* (2006.01)
*B60J 7/00* (2006.01)

(52) U.S. Cl. ................... 296/214; 296/216.08

(58) Field of Classification Search .................. 296/214, 296/216.06–216.08

See application file for complete search history.

(56) References Cited

U.S. PATENT DOCUMENTS

| | | | | |
|---|---|---|---|---|
| 4,923,245 | A | * | 5/1990 | Kuwabara ................. 296/214 |
| 6,343,831 | B1 | * | 2/2002 | Nabert et al. ............ 296/187.05 |
| 2006/0255627 | A1 | * | 11/2006 | Hirotani et al. ............ 296/214 |
| 2010/0127536 | A1 | * | 5/2010 | Dykman et al. ......... 296/216.07 |

FOREIGN PATENT DOCUMENTS

| | | |
|---|---|---|
| JP | 08-310299 A | 11/1996 |
| JP | 09-048294 A | 2/1997 |
| JP | 2002-036948 A | 2/2002 |
| JP | 2002-283849 A | 10/2002 |
| JP | 2008-037318 A | 2/2008 |

* cited by examiner

*Primary Examiner* — Dennis H Pedder
(74) *Attorney, Agent, or Firm* — Morgan, Lewis & Bockius LLP

(57) ABSTRACT

A joint structure for fixing between a sunroof and a headliner, may include a headliner defining an opening, wherein a portion of the headliner around the opening protrudes and is curved upwards to define the opening, and the headliner has a face fabric attached to a surface thereof, a bracket attached to an upper end portion and a lower portion of the headliner, outside of the opening, wherein the bracket has a support end portion protruding in a direction opposite to the opening, a clip into which the support end portion of the bracket is selectively fitted, and a sunroof frame coupled with an upper portion of the clip, wherein the sunroof is provided on the sunroof frame.

2 Claims, 4 Drawing Sheets

JOINT STRUCTURE FOR FIXING BETWEEN SUNROOF AND HEADLINER

CROSS REFERENCE TO RELATED APPLICATION

The present application claims priority to Korean Patent Application Number 10-2009-0069999 filed on Jul. 30, 2009, the entire contents of which application is incorporated herein for all purposes by this reference.

BACKGROUND OF THE INVENTION

1. Field of the Invention

The present invention relates to a joint structure for fixing between a sunroof and a headliner, in particular, to one which can reduce manufacturing costs and improve product quality by automatically wrapping a headliner face fabric around the interior of the roof of a vehicle as well as improve merchantability and convenience by increasing the size of a roof opening.

2. Description of Related Art

As is well known in the art, a sunroof is a convenience device with a shade member, which is installed on the roof of a vehicle. The shade member can be tilted or slid open to provide extra ventilation and/or light, thereby allowing occupants to feel more comfortable.

FIG. 1 is a cross-sectional view illustrating a conventional vehicle headliner 1. According to conventional approaches, the headliner 1 is located as close as possible to a sunroof frame 4 in order to increase the size of a roof opening. The headliner 1 located close to the sunroof frame 4 allows only a small difference in height "a" between the support end portion of a bracket 3, which is used to fix the headliner 1 to the sunroof frame 4, and the upper end portion of the headliner 1. This, as a result, makes it impossible to automatically wrap a headliner face fabric 2 around the interior of the roof of a vehicle. Even if the face fabric 2 can be manually wrapped, this would disadvantageously increase manufacturing costs and deteriorate the quality of the face fabric 2.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide a joint structure for fixing between a sunroof and a headliner, which can reduce manufacturing costs and improve product quality by automatically wrapping a headliner face fabric around the interior of the roof of a vehicle as well as improve merchantability and convenience by increasing the size of a roof opening.

In an aspect of the present invention, the joint structure for fixing between a sunroof and a headliner, may include a headliner defining an opening, wherein a portion of the headliner around the opening protrudes and is curved upwards to define the opening, and the headliner has a face fabric attached to a surface thereof; a bracket attached to an upper end portion and a lower portion of the headliner, outside of the opening, wherein the bracket has a support end portion protruding in a direction opposite to the opening; a clip into which the support end portion of the bracket is selectively fitted; and a sunroof frame coupled with an upper portion of the clip, wherein the sunroof is provided on the sunroof frame.

The support end portion may protrude from the bracket between upper and lower end portions thereof in the direction opposite to the opening.

The face fabric may be wrapped around the upper end portion of the headliner around the opening, starting from an underside of the headliner, and may be continuously attached to an outer portion of the headliner, outside of the opening, and wherein the clip presses a portion of the face fabric attached to the outer portion of the headliner, outside of the opening to fix the portion of the face fabric thereto.

The face fabric may extend to cover the upper end portion of the headliner between the upper end portion and the lower portion of the headliner.

The support end portion of the bracket may have at least a protrusion extending perpendicular to a direction of which the clip is coupled to the support end portion, and the clip has corresponding recesses to selectively receive the at least a protrusion therein to enhance a coupling force between the bracket and the clip.

According to various aspects of the present invention, the joint structure for fixing between a sunroof and a headliner has the following effects, First, the automatic wrapping of the headliner face fabric around the interior of the roof of the vehicle can reduce manufacturing costs while improving product quality.

Second, the increase in the size of the roof opening can lead to an improvement in merchantability and convenience.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
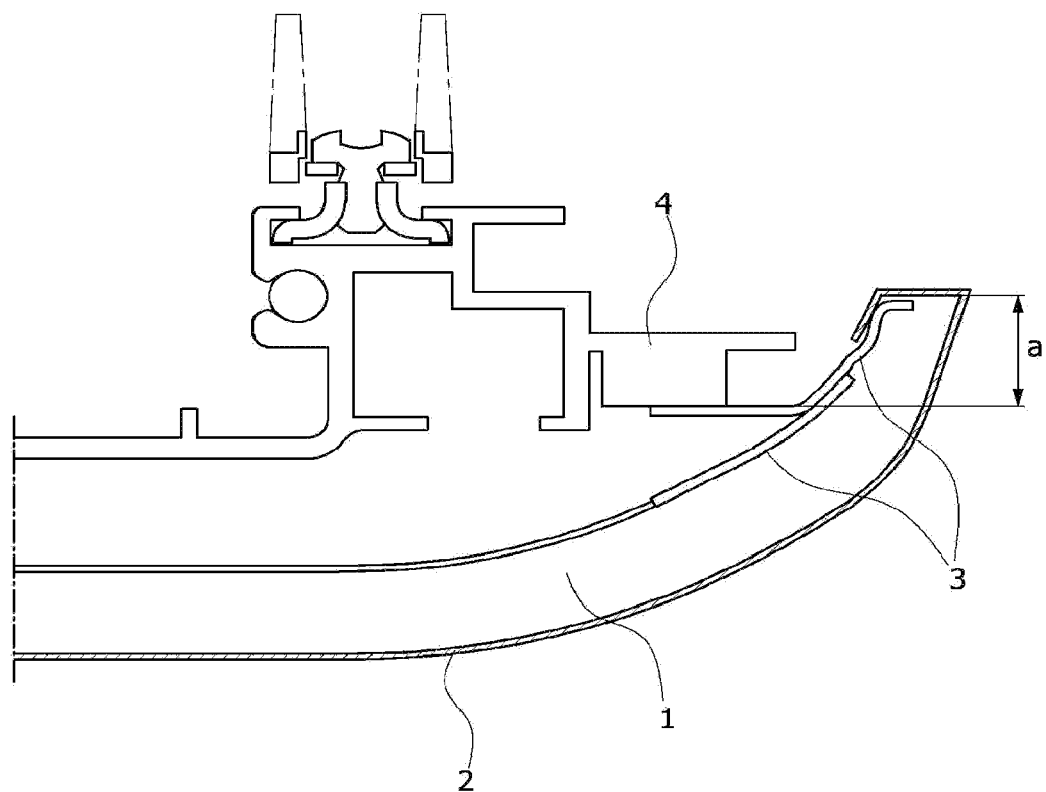
FIG. 1 is a cross-sectional view illustrating a conventional joint structure for fixing between a sunroof and a vehicle headliner.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A joint structure for fixing between a sunroof and a vehicle headliner in accordance with an exemplary embodiment of the invention will now be described more full fully hereinafter with reference to FIGS. 2 through 4.

Figure 2:
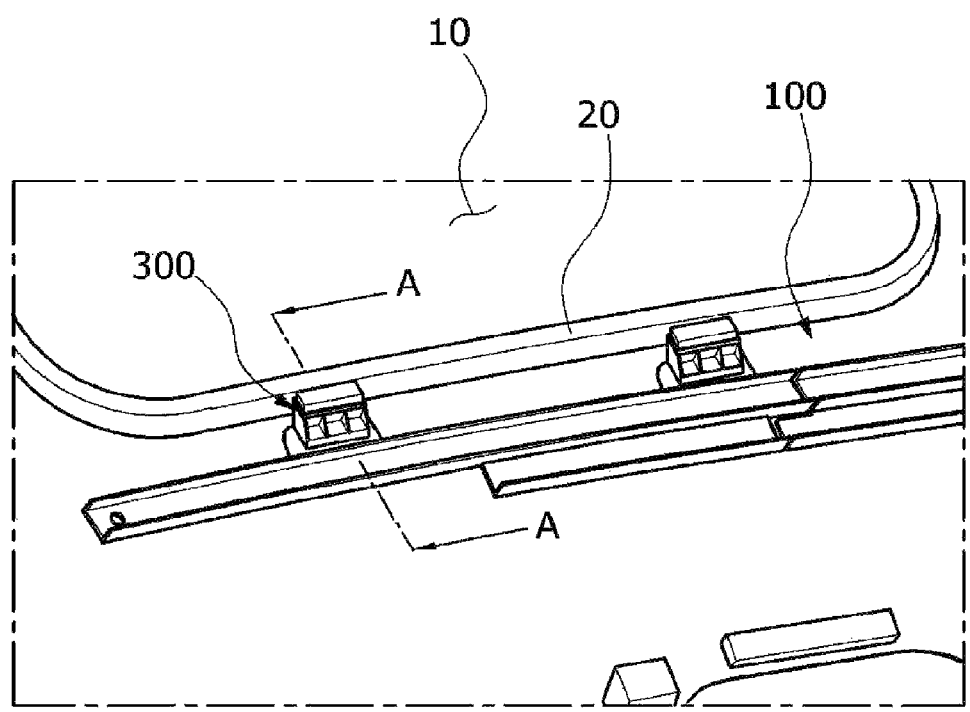
FIG. 2 is a perspective view illustrating a joint structure for fixing between a sunroof and a vehicle headliner in accordance with an exemplary embodiment of the invention.
Figure 3:
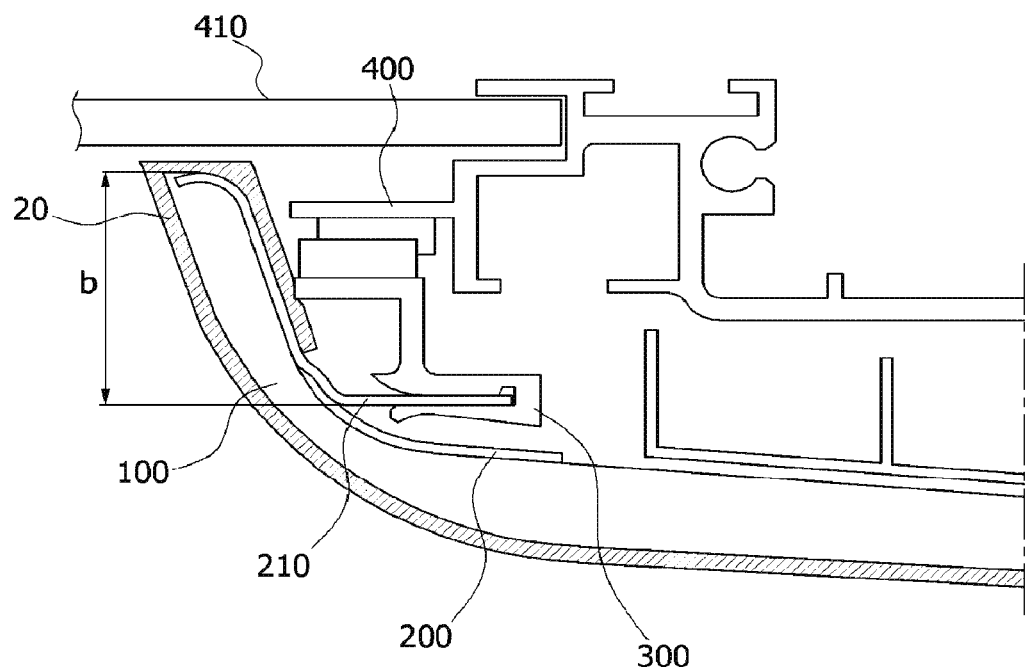
FIG. 3 is a cross-sectional view taken along line A-A in FIG. 2.
Figure 4:
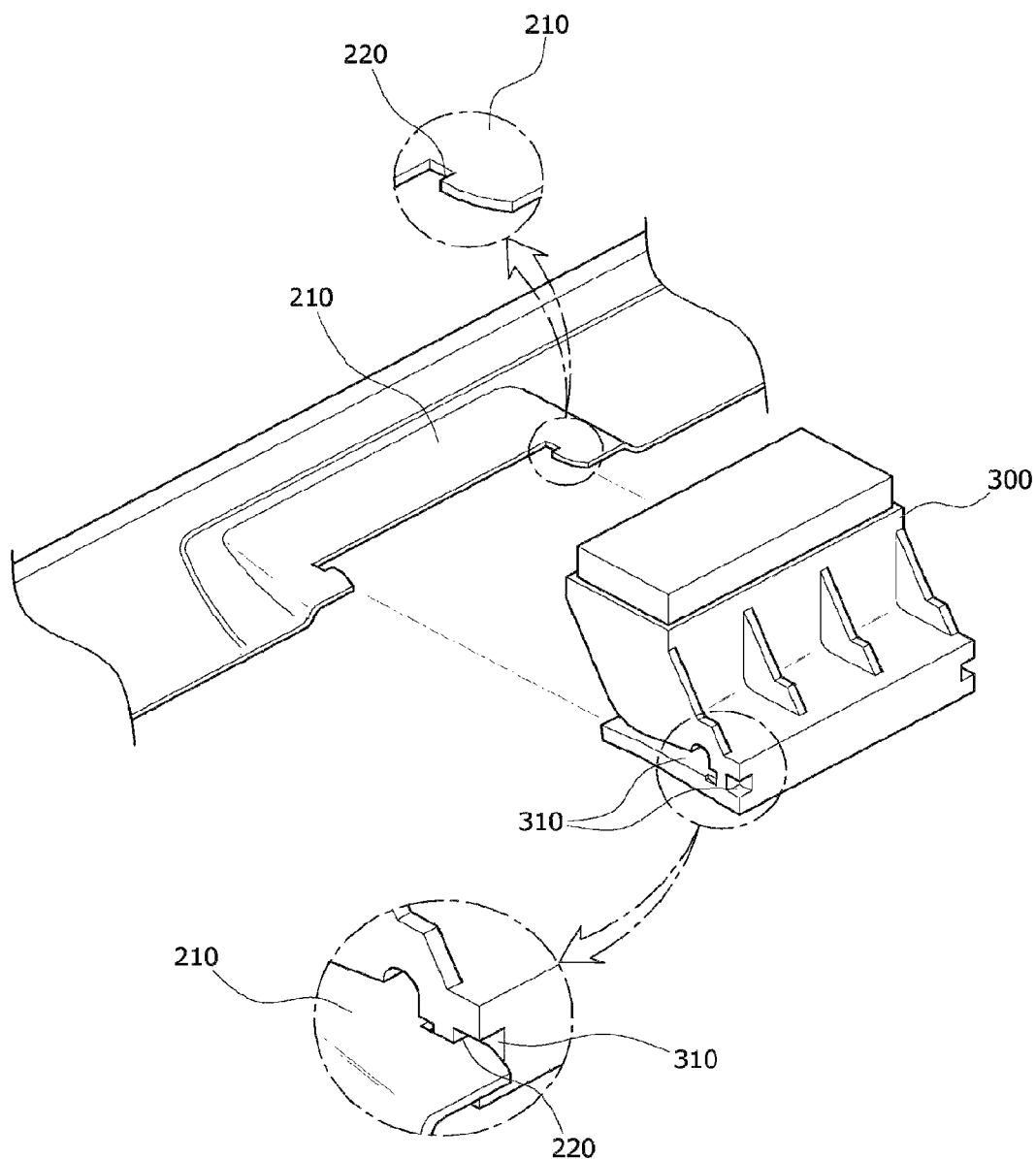
FIG. 4 is an exploded perspective view illustrating part of the joint structure for fixing between a sunroof and a vehicle headliner in accordance with an exemplary embodiment of the invention.

FIG. 2 is a perspective view illustrating the joint structure for fixing between a sunroof and a vehicle headliner in accordance with an exemplary embodiment of the invention, FIG. 3 is a cross-sectional view taken along line A-A in FIG. 2, and FIG. 4 is an exploded perspective view illustrating part of the structure for fixing between a sunroof and a vehicle headliner in accordance with an exemplary embodiment of the invention.

The joint structure for fixing between a sunroof and a vehicle headliner in accordance with an exemplary embodiment of the invention includes a headliner 100, a bracket 200, a clip 300, and a sunroof frame 400.

The headliner 100 defines an opening 10 therein, with a portion thereof around the opening 10 and protruding and curved upwards. The headliner 100 has a face fabric 20 attached to the surface thereof. The bracket 200 is attached to the upper end portion of the headliner 100, outside of the opening 10. The bracket 200 has a support end portion 210 protruding in a direction opposite to the opening 10. The support end portion 210 of the bracket 200 is fitted into the clip 300. The sunroof frame 400 is coupled with the upper portion of the clip 300 such that a vehicle sunroof 410 is provided on the sunroof frame 400.

As described above, the size of the roof opening 10 can be increased to provide extra ventilation while allowing occupants to feel more comfortable. In order to increase the size of the roof opening 10, the headliner 100 is required to be located as close as possible to the sunroof frame 400. As shown in FIG. 1, if the conventional approaches are used as they are, it is impossible to automatically wrap the face fabric 2 of the headliner 1 around the interior of the roof of the vehicle. This is because, as the headliner 1 is close to the sunroof frame 4, the difference in height "a" between the support end portion of the bracket 3 and the upper end portion of the headliner 1 is reduced. This, as a result, leads to a decrease in the length of the face fabric 20, which is directed downwards after wrapped around a portion of the headliner 1 around the opening 10. Accordingly, an operator has to manually carry out the wrapping in person, thereby increasing manufacturing costs. In addition, product quality is not reliable due to the manual work.

In accordance with an exemplary embodiment of the invention, as shown in FIG. 3, a difference in height "b" between the support end portion 210 of the bracket 200, which fixes the headliner 100 to the sunroof frame 400, and the upper end portion of the headliner 100 is greater than that of the conventional structure. This, as a result, makes it possible to automatically wrap the face fabric 20 of the headliner 100 around the interior of the roof of the vehicle, thereby advantageously reducing manufacturing costs as well as ensuring reliable product quality.

The portion of the headliner 100 around the opening 10 is curved and protrudes upwards, and the bracket 200 is located outside of the opening 10. The support end portion 210 of the bracket 200 is configured to extend in a direction opposite to the opening 10. This is to improve aesthetic appearance by concealing the joint structure when the face fabric 10 of the headliner 100 is wrapped around the interior of the roof of the vehicle can be automated.

However, if the support end portion 210 of the bracket 200 for fixing the headliner 100 is located far from the upper end portion of the headliner 100, the vertical distance of the support end portion 210 from the sunroof frame 400 is also increased. This, as a result, may make it impossible to provide a stable structural support to the sunroof frame 400 even if the wrapping of the face fabric 20 around the interior of the roof of the vehicle can be automated.

To overcome this potential problem, the clip 300 can be used, of which the lower end is fitted on the support end portion 210 of the bracket 2100 and the upper end portion is fixed to the sunroof frame 400. The use of the clip 300 allows fixing of the sunroof to the headliner 10 by compensating for the difference in height between the bracket 200 and the sunroof frame 400. This, as a result, can allow the increase in the opening of the headliner 100 as well as the automatic wrapping of the face fabric 20 of the headliner 100.

The face fabric 20 is wrapped around the upper end portion of the headliner 100 around the opening 10, starting from the underside of the headliner 100, and is continuously attached to an outer portion of the headliner 100 outside of the opening 10. The clip 300 is configured to press a portion of the face fabric 20 attached to the outer portion of the headliner 100, outside of the opening 10.

In general, the face fabric 20 is attached to the vehicle headliner 100. Since the headliner 100 is made of metal, the face fabric 20 attached to the headliner 100 improves aesthetic appearance. In addition, since the headliner 100 can come into contact with the skin of an occupant, the attachment of the face fabric 20 on the headliner 100 itself is preferable in terms of safety.

In general, the face fabric 20 of the headliner 100 is continuously connected to the upper surface of the headliner 100 through the upper end portion of the headliner 100 around the opening 10, starting from the underside of the headliner 100. If one end of the face fabric 20 is simply attached by an adhesive member or the like, the face fabric 20 can be separated from the headliner 100 while the operator is installing the headliner 100 or a driver is driving a vehicle.

The clip 300 is used in order to prevent this problem. As shown in FIG. 3, the face fabric 20 can be stably attached to the headliner 100 by fixing one end of the face fabric 20, which extends downwards after wrapped around the upper end portion of the headliner 100 around the opening 10, by the clip 300. This can be enabled by providing the bracket 200 to the headliner 100 during the manufacturing process of the headliner 100 and by fixing the clip 300 to the support end portion 210 of the bracket 200 after the face fabric 20 is automatically wrapped.

The support end portion 210 of the bracket 200 has protrusions 220 extending perpendicular to a direction, by which the clip 300 is coupled to the bracket 200 (hereinafter, referred to as "clip-coupling direction"). The clip 300 has recesses 310 formed in opposite lower portions thereof, shaped to receive the protrusions 220. The protrusions 220 are fitted into the recesses 310, thereby enhancing a coupling force between the bracket 200 and the clip 300.

If the coupling between the bracket 200 and the sunroof frame 400 of this embodiment is realized by simply fitting the clip 300 into the bracket 200, it may be less secure than the conventional structure in which the bracket 3 is directly coupled with the sunroof frame 4.

Accordingly, the clip 300 is not simply fitted into the support end portion 210 of the bracket 200. Rather, as shown in FIG. 4, the protrusions 220 extend from the support end portion 210 perpendicularly to the clip-coupling direction, in which the clip 300 is coupled to the bracket 220, and the recesses 310 are formed in the opposite lower portions of the clip 300, in a shape to receive the protrusions 220, such that the bracket 200 and the sunroof frame 400 can be more securely coupled with each other.

In an exemplary embodiment of the present invention, the clip 300 may be made of an elastic material rather than metal regarding the characteristics of a vehicle, which suffers from vibration. The elastic clip is intended to absorb impacts caused by vibration. In addition, the elastic clip can be easily attached to and detached from the support end portion 210 of the bracket 200.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A joint structure for fixing between a sunroof and a headliner, comprising:
   a headliner defining an opening, wherein a portion of the headliner around the opening protrudes and is curved upwards to define the opening, and the headliner has a face fabric attached to a surface thereof;
   a bracket attached to an upper end portion and a lower portion of the headliner, outside of the opening, wherein the bracket has a support end portion protruding in a direction opposite to the opening;
   a clip into which the support end portion of the bracket is selectively fitted; and
   a sunroof frame coupled with an upper portion of the clip, wherein the sunroof is provided on the sunroof frame;
   wherein the face fabric is wrapped around the upper end portion of the headliner around the opening, starting from an underside of the headliner, and is continuously attached to an outer portion of the headliner, outside of the opening, and wherein the clip presses a portion of the face fabric attached to the outer portion of the headliner, outside of the opening to fix the portion of the face fabric thereto; and
   wherein the support end portion of the bracket has at least a protrusion extending perpendicular to a direction of which the clip is coupled to the support end portion, and the clip has corresponding recesses to selectively receive the at least a protrusion therein to enhance a coupling force between the bracket and the clip.

2. The structure in accordance with claim 1, wherein the support end portion protrudes from the bracket between upper and lower end portions thereof in the direction opposite to the opening.

* * * * *